(12) United States Patent
Beisch et al.

(10) Patent No.: US 7,522,316 B2
(45) Date of Patent: Apr. 21, 2009

(54) DEVICE AND METHOD FOR AUTOMATED CALIBRATION OF DIGITAL INPUT DEVICES

(76) Inventors: Clemens Beisch, Thalkirchnerstrasse 107, 81371 Munich (DE); Greg Remington, St. Valentin Wig 2, 85774 Unterfohring (DE)

( * ) Notice: Subject to any disclaimer, the term of this patent is extended or adjusted under 35 U.S.C. 154(b) by 1177 days.

(21) Appl. No.: 10/739,411

(22) Filed: Dec. 19, 2003

(65) Prior Publication Data
US 2005/0134961 A1   Jun. 23, 2005

(51) Int. Cl.
*H04N 1/40* (2006.01)
*H04N 1/04* (2006.01)
*H04N 1/46* (2006.01)

(52) U.S. Cl. ............... 358/448; 358/498; 358/474; 358/505

(58) Field of Classification Search ......... 358/448, 358/498, 474, 505, 1.9, 100, 462.11, 462.14; 382/100; 235/462.11, 462.14
See application file for complete search history.

(56) References Cited

U.S. PATENT DOCUMENTS

| | | |
|---|---|---|
| 5,667,944 A | 9/1997 | Reem et al. |
| 7,317,557 B2 * | 1/2008 | Pollard et al. ............... 358/448 |
| 2002/0044311 A1 | 4/2002 | Beisch et al. |

FOREIGN PATENT DOCUMENTS

| | | |
|---|---|---|
| EP | 1 180 724 A2 | 2/2002 |
| JP | 9-96565 | 4/1997 |

OTHER PUBLICATIONS

German Examination Report dated Nov. 14, 2007.

* cited by examiner

*Primary Examiner*—Houshang Safaipour
(74) *Attorney, Agent, or Firm*—Foley & Lardner LLP

(57) ABSTRACT

The invention relates to a method and device for automated calibration of digital input devices, particularly scanners and digital cameras.

10 Claims, 1 Drawing Sheet

DEVICE AND METHOD FOR AUTOMATED CALIBRATION OF DIGITAL INPUT DEVICES

Figure 1:
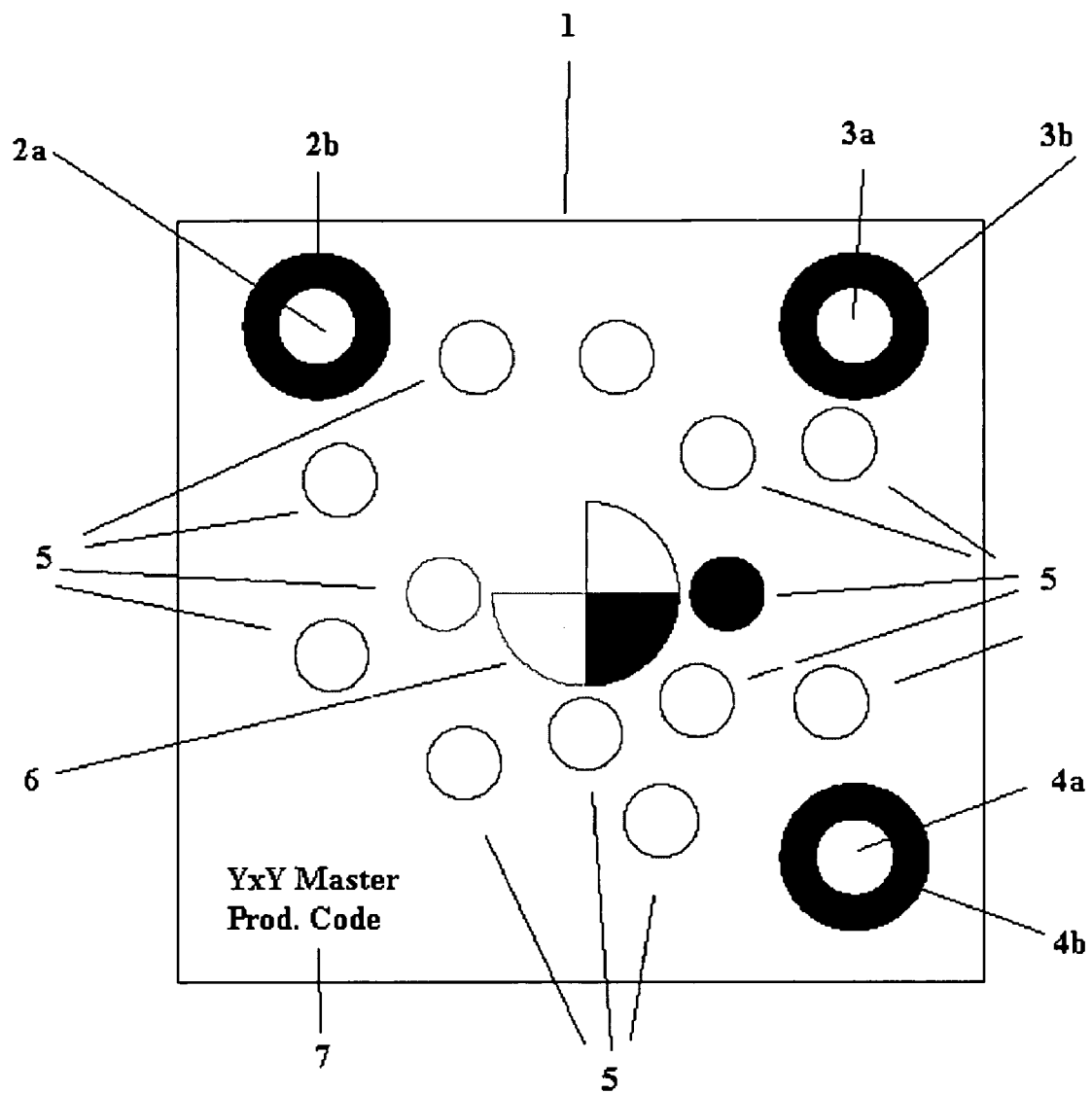

The invention relates to a method and device for automated calibration of digital input devices, particularly scanners and digital cameras.

When digital photos are taken, photoelectric sensitive circuits such as photo diodes produce analog data, which is converted by an A/D converter into digital values afterwards. For black and white pictures the intensity values are measured across the complete measurable spectrum. For color pictures different measurement spectra are measured by certain provisions, for example by different photosensitive circuits. Each color corresponds to a measurement spectrum. The result is a color data set. At present, there are mainly two methods known for classification of colors in the digital field: the RGB-method which is used, for example, in monitor technology and which describes the colors as an addition of the primary colors red, green, and blue, and the CMYK-method which is used, for example, in the printing technology. The CMYK-method is a pigment or dye method in which, depending on the applied color pigments or color dyes, colors are filtered from the reflected ambient light. The colors cyan, magenta, yellow, and blac<u>k</u>are used as pigments. This method is also called filtering method because it mixes the colors substractively, i.e. the more colors are printed on top of each other the less light is reflected.

Due to different characteristic curves of the individual photo-electrical sensitive circuits of different digital input devices and depending on the provided illumination, the result from the RGB method, which is commonly used in such devices, are different color values for one object. For further processing such as print products, presentation on a monitor, and/or projection it is therefore necessary to calibrate digital input devices to achieve pure colors.

Methods according to the state of the art provide for a calibration master or calibration target to be arranged on a scanner or in front of a digital camera and for correction values to be calculated from the scanned or taken photo afterwards. Particularly in professional applications these methods are complemented by arranging a calibration target within the image, taking a photo of the object with the calibration target, and then marking this calibration target on a computer monitor with a frame and processing it afterwards. However, in case the calibration target is not arranged in a preferred perpendicular alignment to the camera in the center of the picture but instead slightly titled, at the boundary or in a corner of the image, the calibration target is represented in a distorted way. The marking frame has to be adapted to this distortion. However, the positioning of a distorted marking frame is much more difficult and thus more time-consuming. Therefore, an increased time exposure of several minutes has to be considered. After the calibration target has been marked with a frame, the position and orientation of the calibration target has to be indicated to the computer to allow the computer to calculate the correction values for the digital input device from the known position, location, and orientation of the calibration target and from the given data of the calibration target.

Calibration targets may be produced with different printing techniques. Offset printing, sheet fed printing or web offset printing, gravure printing or screen printing with a different number of printing colors may be used.

It is an object of the present invention to provide a method and a device for calibrating digital input devices, particularly scanners and digital cameras, which eliminate the disadvantages associated with systems according to the state of the art.

Therefore, an automated method and a device are provided which allow for automated calibration.

For this purpose, an automated method and a device have to fulfill the following functions.

The calibration target has to be localized within an image detail. For this reason at least one target search point has to be provided on a calibration target which may be localized from the image information by an appropriate method or an appropriate means.

Different devices and the corresponding methods may be used. In order to be able to find a target search point within a picture it ought to be sufficiently distinguishable, for example, a certain pattern, which can be localized by a device or a method for detection, may be provided on a calibration target. A pattern may comprise shape and/or color.

Furthermore, the size of the calibration target has to be determined. For this, the size of the pattern, which has been detected, may be used. It is further possible to determine the size of the calibration target from the distance between at least two patterns.

Similarly, the relative location and orientation of the calibration target within the image has to be determined. For example the shape of the pattern, the relative alignment of different patterns to each other, or an identification of the patterns may be used for this purpose.

After these parameters have been determined automatically, the color correction values and/or the values for the white balance are determined automatically from the given data of the calibration target.

Particularly the speed as well as the accuracy of the calibration for digital input devices is improved. The method and the device provide for a low cost automated calibration for input devices.

The invention is explained in detail by means of the figure and the description of a typical calibration procedure.

FIG. 1 depicts a preferred embodiment of a calibration target according to the present invention.

At the beginning of a calibration procedure a calibration target (1) according to the present invention (FIG. 1) is positioned within the image range of the digital input device. A photo is taken and the digital image is transferred to a computer.

An automatic localization of the calibration target (1) within an image is now possible due to the characteristics of the preferred embodiment of the calibration target (1). For this, the position of the target search points (2, 3, 4), which are displayed as color circles (2a, 3a, 4a) having each a black border (2b, 3b, 4b), is determined in the present example.

A simple method for this purpose is the processing of individual color channels. In the present example the target search points (2, 3, 4) are color circles having a black border. By processing the image data, areas are detected which are displayed as a sequence of an intense black component (2b, 3b, 4b), an intense color component, and again an intense black component. This may be realized very simple if the colors are primary colors or mixtures thereof. In the present example of a preferred embodiment, for example, by choosing yellow as color for the color circle and black as border color, an intense change in contrast in the green and red channel may be detected while no change in contrast occurs in the blue channel. As a result, a suppression of reflection is also possible because reflections reflect the complete illumination spectrum and, by using white light, all colors are reflected with the same intensity. The choice of spot colors is especially preferred due to the fact that these represent a maximum change in contrast.

By choosing a round shape for the target search points (2, 3, 4) the detection does not depend on the relative location of the calibration target (1) due to the fact that even in case of a rotation of the calibration target (1) the relationship between black border and color circle does not depend on the location.

Based on the spatial position of the three target search points (2, 3, 4) the size of the calibration target (1) within the image may be determined automatically even in case it is at the edge or in the corner of the image and/or is slightly titled. The target search points (2, 3, 4) are arranged at the edge of the rectangular calibration target (1) and form the corners of a triangle. Particularly, the calibration target is of a rectangular shape and therefore the target search points form the corners of an isosceles right-angled triangle. By parallel translation of the catheti of the target triangle into the unused target search point, respectively, or by mirroring of the unused target search point at the hypotenuse of the target triangle, the undetermined corner may be determined automatically. Thus, all four corners are determined. In case of a strong tilt an angle between the catheti of the triangle is developed which differs significantly from 90°, and other methods for determining the forth corner have to be applied.

Still, the problem of locating the calibration target (1) within the image section remains. Since the calibration target (1), even if it is, for example, upside down or rotated by an angle, has to be detected, too, further information is necessary to determine the location automatically in a correct manner. For this purpose, a corresponding identification may be used besides the arrangement of the target search points (2, 3, 4). In the present example of embodiment target search point (2a) is colored cyan, target search point (3a) magenta, and target search point (4a) yellow and surrounded by a black border (2b, 3b, 4b), respectively. Thus, when detecting the position the identification of the target search point may be determined, too, due to the fact that the cyan target search point causes a contrast change in the blue and green channel, the magenta target search point causes a contrast change in the blue and red channel.

By use of different colors for the identification of the individual target search points (2, 3, 4) the effort of detecting the identification is reduced significantly due to the fact that no pattern detection is necessary but only a contrast detection. Furthermore, the identification by color allows a simple automatic detection of orientation. This is important, for example, in case that a photo is taken using a mirror and, for example, only the reflected calibration target (1) is displayed in the image. The identification helps to decide if the calibration target (1) detected in the image is a real or a virtual image. In case it is a real image the colors of the target search points (2a, 3a, 4a) are in the example of embodiment cyan-magenta-yellow in clockwise order while in the reflected arrangement the colors of the target search points (2a, 3a, 4a) are yellow-magenta-cyan in clockwise order.

After having determined the exact position, location, and orientation of the calibration target the automatic determination of the color correction values and/or of the white balance may be done.

For practical purposes a sufficient number of defined color areas (5) are arranged on the calibration target (1). The number, localization, and shape of the color areas can be chosen according to the particular requirements, the color areas, for example, may have a circular shape and approximately the same size Particularly, color circles (2a, 3a, 4a) of the target search points (2, 3, 4) can be used as color areas for the calibration.

Furthermore, a gray scale (6) may be provided for practical purposes to be able to perform an automatic white balance. Different shapes and positions on the calibration target are possible, the gray scale, for example, may be provided circularly with black segments of different intensity and may be arranged, for example, in the center of the calibration target.

Since the locations of individual color areas (5), calibration targets (2, 3, 4), color circles of the calibration targets (2a, 3a, 4a) and gray scale (6) are known as well as the color data or black-and gray scale data, respectively, determined from the image by position, location, and orientation data, the data for the automatic white balance and/or the color correction data may now be determined.

In addition, one ore more areas for product identification (7) or other information may be provided on the calibration target.

Furthermore, the calibration target (1) may have different sizes and shapes due to the fact that for calibration, the position of target search points (2, 3, 4) and the knowledge about the relative position of the target search points and the position of the color areas (5) on the calibration target (1) are sufficient.

In case that the automatic detection of the calibration target is not possible it may be provided that, for example, one ore more target search points may be chosen manually and the detection may be started once again or that the calibration target is marked manually in the image section.

The presented method and device may be integrated in existing systems without effort.

The device may be produced using varying printing techniques. For example, offset printing, sheet fed printing or web offset printing, gravure printing or screen printing with a different number of print colors may be used. Particularly, frequency modulated printing screens may be used.

LIST OF DRAWING REFERENCES 1 calibration target
2 target search point consisting of color circle (2a) and border (2b)
3 target search point consisting of color circle (3a) and border (3b)
4 target search point consisting of color circle (4a) and border (4b)
5 color areas
6 gray scale
7 product identification

The invention claimed is:

1. A device for calibrating digital input devices (calibration target) comprising:
    at least three target search points for automatically determining the size of the calibration target arranged as vertexes of an isosceles right-angled triangle;
    wherein at least one target search point is for automatically determining the position in an image, whereby automated calibration is facilitated.

2. A device for calibrating digital input devices (calibration target) comprising:
    at least two target search points for automatically determining the orientation within an image, wherein the target search points are distinguishably marked by different colors, and wherein at least one target search point is for automatically determining the position in an image, whereby automated calibration is facilitated.

3. A device for calibrating digital input devices (calibration target) comprising at least one target search point for automatically determining the position in an image, whereby automated calibration is facilitated, wherein the calibration target is produced by a frequency modulated screen with four-color printing or multicolor printing.

4. A method for calibrating digital input devices comprising:
(a) localizing a calibration target;
(b) determining the location of the calibration target; and
(c) determining the orientation of the calibration target,
wherein at least one target search point within an image is automatically localized to determine its position; and
wherein the position of at least one target search point is automatically determined from a contrast difference within at least one color channel.

5. A method for calibrating digital input devices comprising:
(a) localizing a calibration target;
(b) determining the location of the calibration target; and
(c) determining the orientation of the calibration target,
wherein at least one target search point within an image is automatically localized to determine its position, and
wherein the position of at least one target search point is automatically determined regardless of its location from a contrast difference in at least one color channel.

6. A method for calibrating digital input devices comprising:
(a) localizing a calibration target;
(b) determining the location of the calibration target; and
(c) determining the orientation of the calibration target,
wherein at least one target search point within an image is automatically localized to determine its position, and
wherein the size of the calibration target is automatically determined based on at least three target search points which are located at a boundary and are arranged as vertexes of an isosceles right-angled triangle.

7. A method for calibrating digital input devices comprising:
(a) localizing a calibration target;
(b) determining the location of the calibration target; and
(c) determining the orientation of the calibration target,
wherein at least one target search point within an image is automatically localized to determine its position, and
wherein the orientation of the calibration target within an image is automatically determined based on at least two target search points distinguishable based on different colors.

8. The method for calibrating digital input devices according to claim 7 wherein the different colours are determined automatically based on a contrast difference in at least one colour channel.

9. A method for calibrating digital input devices comprising:
(a) localizing a calibration target;
(b) determining the location of the calibration target; and
(c) determining the orientation of the calibration target,
wherein at least one target search point within an image is automatically localized to determine its position, and
wherein colour correction values are generated automatically based on a plurality of given areas coloured differently.

10. A method for calibrating digital input devices comprising:
(a) localizing a calibration target;
(b) determining the location of the calibration target; and
(c) determining the orientation of the calibration target,
wherein at least one target search point within an image is automatically localized to determine its position, and
wherein values for a white balance are produced automatically based on at least a given gray scale.

* * * * *